INVENTOR.
HUGH B. CARR.

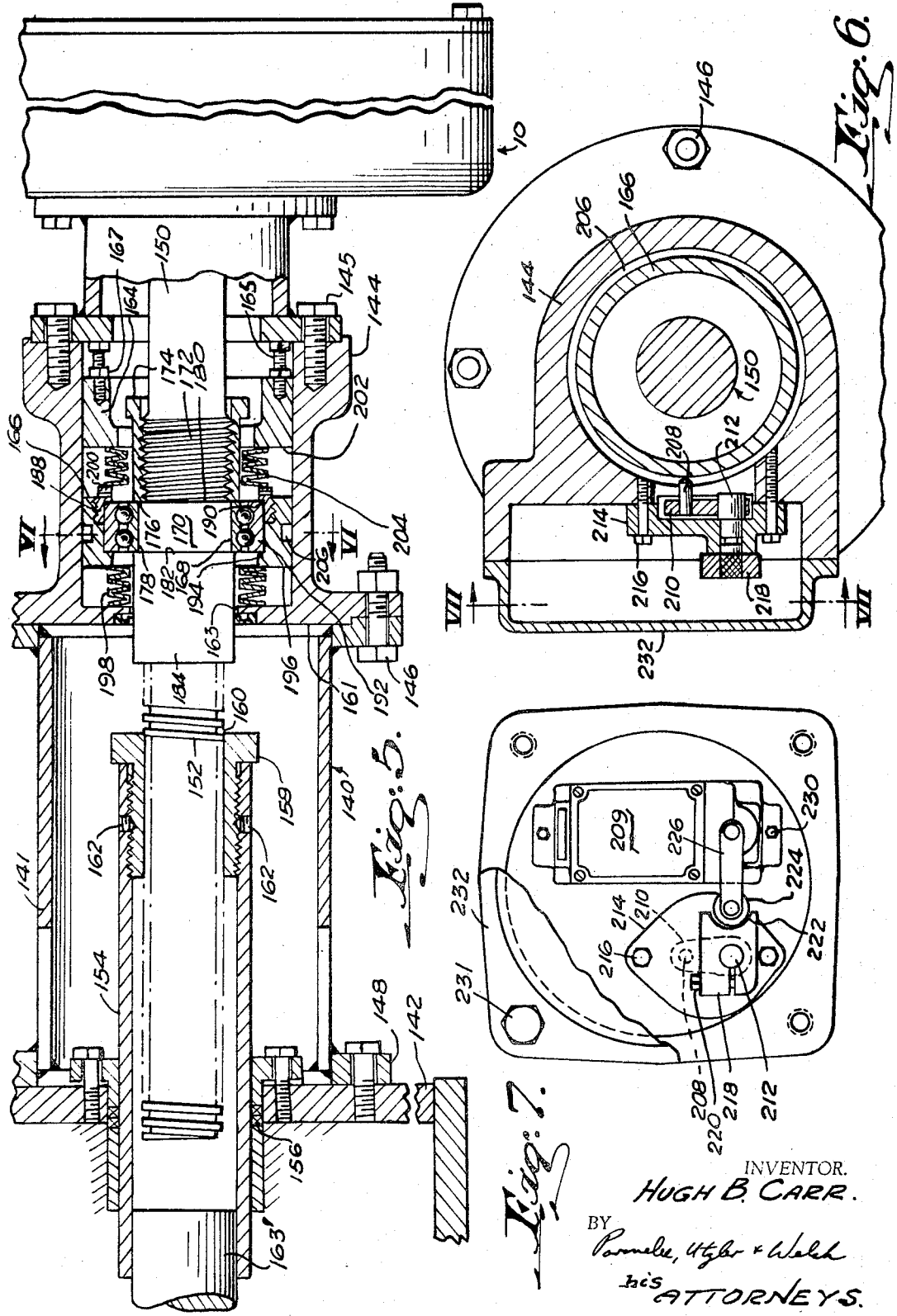

United States Patent Office 3,435,696
Patented Apr. 1, 1969

3,435,696
PROTECTIVE APPARATUS
Hugh B. Carr, Carnegie, Pa., assignor to S. P. Kinney Engineers, Inc., Carnegie, Pa., a corporation of Pennsylvania
Filed Aug. 18, 1967, Ser. No. 661,699
Int. Cl. F16h 1/20
U.S. Cl. 74—424.8    6 Claims

ABSTRACT OF THE DISCLOSURE

This application discloses a protective apparatus for an electric motor driven mechanism for opening the circuit to the motor when the driven mechanism encounters abnormal resistance. There is provided in the driven mechanism a drive shaft which is rotated by the motor and engaged with a driven member and which is supported for limited axial movement. Overload restraining means, as for example a spring, holds the shaft in a normal operating position but when the driven member encounters excessive resistance to movement the increased torque on the drive shaft then effects axial movement of the drive shaft which movement is translated to a switch that opens the motor circuit. This axial movement or thrust is obtained by a thread-like formation on the drive member through which motion is transmitted to the driven member, as in the case of a worm gear on the drive shaft engaging a worm wheel on the driven member or a thread on the drive shaft imparting rectilinear motion to a nut on the driven member.

BACKGROUND OF THE INVENTION

Field of the invention

This invention relates to protective apparatus and more particularly to protective apparatus for use in conjunction with an electric motor driven shaft which may become subject to an over torque condition.

Description of the prior art

In copending application Ser. No. 573,397, filed Aug. 18, 1966, and hereby incorporated by reference into the instant application, an actuating and gear reducing mechanism to effect the operation of heavy valves, such as are employed in blast furnaces, and similar heavy rugged equipment is disclosed. At times such heavy valves and similar heavy rugged equipment operated by the actuating and gear reducing mechanism encounter obstructions, jam or some other adverse operating condition occurs during the course of their operation and unless a protective device is provided to prevent operation of the electric motor powering the actuating and gear reducing mechanism damage may result to the electric motor and/or actuating and gear reducing mechanism. In the past, the motor operation was generally controlled in the conventional manner through limit switches on the mechanisms which the actuating and gear reducing mechanism operated at the end of their travel, i.e., in the case of valves, fully open or fully closed. No provision, however, was made to control the motor operation in the event the mechanism being operated encountered an adverse operating condition during the course of its operation or travel.

SUMMARY

Briefly, the present invention provides an electrically controlled power means operatively connected to a rotatable member for effecting rotation thereof. The rotatable member is operatively connected with a driven member to effect movement thereof. A switch means is mounted adjacent to the shaft and electrically connected with the power means. Cooperating means are carried by the rotatable member and driven member which cause the rotatable member to move linearly relative to the driven member between a normal operating position and a switch operating position in response to the driven member encountering a predetermined restraining force. A switch operating means is secured to the rotatable member to effect deactuation of the power means when the rotatable member is in its switch operating position.

Accordingly, with the present invention, in the event the heavy valve or similar heavy rugged equipment encounters an obstruction, jams or some other adverse operating condition occurs during the course of their operation, the electric motor powering the actuating and gear reducing mechanism will become deactuated thereby preventing damage to the electric motor and/or actuating and gear reducing mechanism.

Thus, the present invention has for its primary object to provide a protective device for use with an actuating and gear reducing mechanism which functions upon the heavy valve or similar heavy rugged equipment being operated by the actuating and gear reducing mechanism encountering an obstruction becoming jammed or some other adverse operating condition occurring during their operation to deactuate the electric motor powering the actuating and gear reducing mechanism, to thereby prevent damage to the electric motor and/or actuating and gear reducing mechanism.

These and other objects and features of the invention will be in part apparent from and in part pointed out in the following detailed description taken in connection with the accompanying drawings.

BRIEF DESCRIPTION OF THE DRAWING

FIGURE 5 is a vertical section of the lower part of the reducing gear unit shown in FIGURE 1 with the worm gear reducer removed therefrom and replaced by a mechanical movement device to be operated by the reducing gear unit and the protective device of the present invention is shown in conjunction with a shaft which is rotated by the gear unit, the shaft, mechanical movement and protective device being shown in vertical section;

FIGURE 6 is a sectional view taken substantially along the line VI—VI of FIGURE 5; and FIGURE 7 is a sectional view taken substantially along the line VII—VII of FIGURE 6.

DESCRIPTION OF THE PREFERRED EMBODIMENTS

Figure 1:
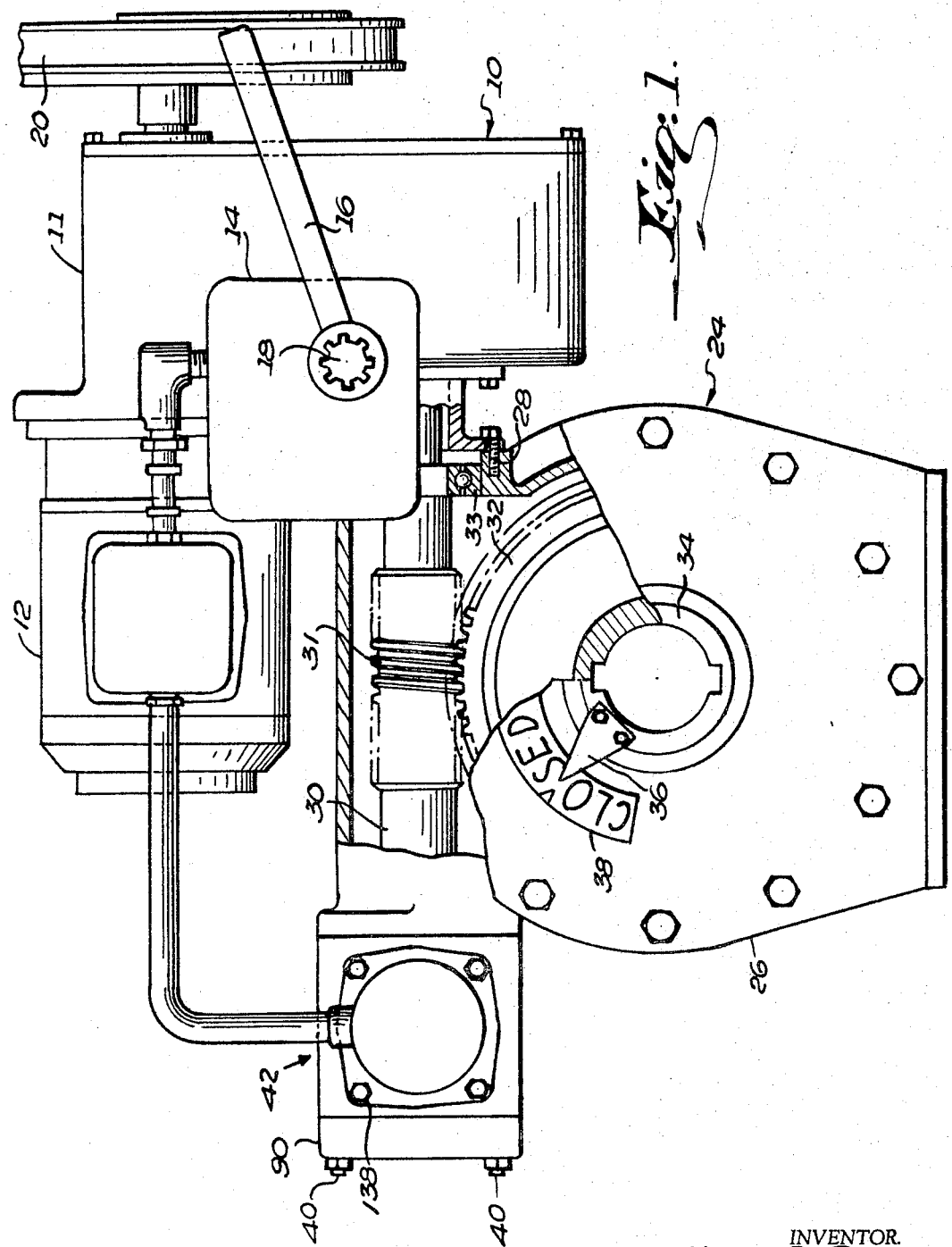
FIGURE 1 is a side elevation of a complete reducing gear unit with a worm gear reducer included with parts thereof in vertical section and the protective device of the present invention shown in conjunction with the worm gear shaft of the worm gear reducer.

Referring now to the drawings, wherein like reference numerals refer to like parts throughout, a reducing gear unit is shown generally at 10. An electric motor 12, which is a reversible motor, drives the various reducing gears within the casing 11. A switch box 14 is secured to the exterior of the casing 11, and has a hand lever 16 on the outer end of a shaft 18 by means of which the shaft 18 can be rocked through a limited arc to move a clutch member within the casing 11 back and forth to permit the various gears within the casing 11 to be driven either by the motor 12 or a hand wheel 20. When the clutch is shifted for manual operation, the electric motor is rendered inoperative by means of a limit switch housed within switch box 14. Only a general description of the gear reducing gear unit has been given here, but its construction and mode of operation are more fully described in copending application Ser. No. 573,397 referred to above. It has been here shown merely for illustrative purposes and for purposes of the present invention it is only necessary to understand that the output shaft of the gear reducing unit may be keyed to either a worm gear reducer as illustrated in FIGURE 1 or to another shaft, as for example that shown in FIGURE 5.

Since the actuating device above described is intended in some instances to operate a large valve which must be opened or closed in perhaps 10 seconds, but in which the valve operating shaft moves through a limited arc, the valve shaft operating device is desirably made as a separate unit, namely, a worm gear reducer generally shown at 24. The worm gear reducer includes an enclosure or supporting frame such as the housing designated generally as 26 which is bolted at 28 to the reducing gear unit 10. A worm gear shaft 30 carrying a worm gear 31 is supported in bearings 33 in the housing 26 and is connected to the output shaft of the reducing gear unit 10. The bearings 33 at each end of the shaft are slidable in their respective mountings within housing 26 so that shaft 30 may move axially with respect to the housing. Worm gear 31 carried on shaft 30 meshes or engages with the gear teeth on worm wheel 32 supported in bearings (not shown) in the housing 26. The worm wheel 32 has a hollow hub 34 into which the shaft of a valve operator or other mechanism may be inserted, to which the shaft is keyed. On the exterior of the hub 34 of the worm wheel 32 there is bolted an indicator 36, while legends 38 on the exterior of the housing 26 provide an indication of the position of the valve or other mechanism being operated at any particular point in the rotation of worm wheel 32. The construction of worm gear reducer 24 and its mode of operation as described thus far are more fully set forth in the above mentioned copending application.

Figure 2:
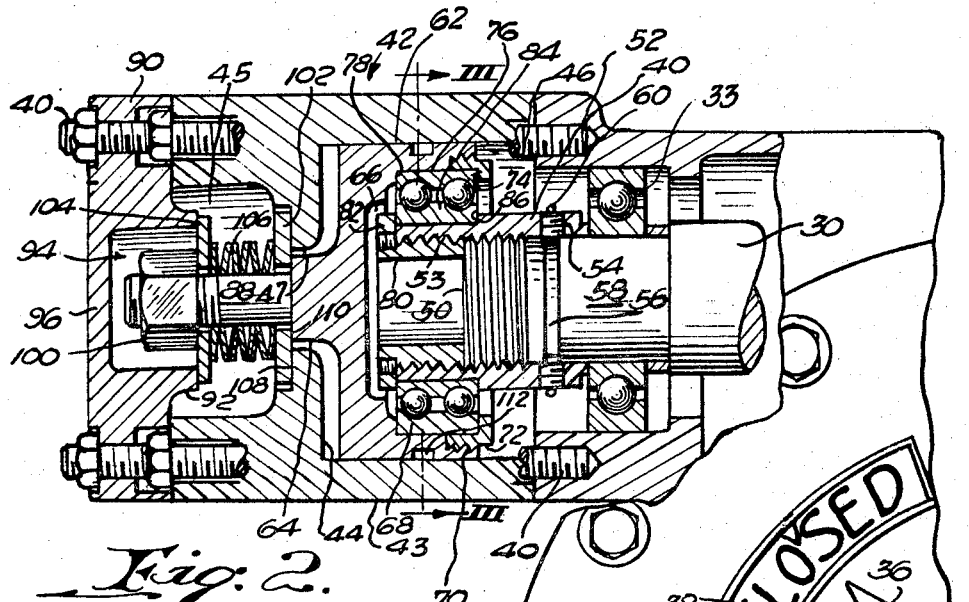
FIGURE 2 is a fragmentary sectional view similar to a portion of FIGURE 1 but on a larger scale illustrating the interior of the switch housing.

Secured to housing 26 by means of threaded bolts 40 is switch housing 42. As best seen in FIGURE 2, the switch housing 42 includes a casing 43 having a flange member 44 extending inwardly from the side walls of the casing 43 which divides the casing into a first cavity 45 and a second cavity 46 communicating with each other through opening 47 in flange member 44. Worm gear shaft 30 includes neck end portion 50 which projects into cavity 46. A cylindrical worm shaft extension member 52 having an internally threaded portion 53 is threaded onto neck portion 50 and is secured thereto by set screws 54 which are received by annular groove 56 provided in the bearing neck portion 58 of shaft 30. A lockwire 60 is provided to insure that set screws 54 remain in place. Slidably or axially movable within cavity 46 is an annular bearing housing 62 which includes an axially extending stem portion 64. Shaft extension member 52 extends into hollow body portion 66 in bearing housing 62 and interposed between shaft extension member 52 and the annular axially extending side walls of bearing housing 62 is a bearing 68 which permits shaft extension member 52 to rotate freely within the bearing housing 62.

Bearing housing 62 includes an internally threaded portion 70 into which is screwed the threaded annular bearing retainer 72. Bearing retainer 72 includes a shoulder portion 74 which abuts the outer bearing race 76. Bearing race 76 is held in abutting relation with annular shoulder portion 78 of bearing housing 62 by bearing retainer 72. The internally threaded portion 53 of shaft extension member 52 has also threaded thereon another bearing retainer 80. Bearing retainer 80 includes an annular flange 82 which abuts the inner bearing race 84. Bearing race 84 is held in abutting relation with annular shoulder portion 86 of shaft extension member 52 by bearing retainer 80. With this arrangement, bearing housing 62 is nonrotatably secured to the worm gear shaft 30.

The stem portion 64 of the bearing housing 62 has extending therefrom and into cavity 45, through the opening 47 provided in flange member 44 a threaded stud 88. A thrust cap 90 is secured to the casing 43 and forms an end wall thereof. The thrust cap 90 includes a raised annular portion 92 on the inside face thereof and a recessed portion 94 formed by the rear wall 96 of the cap 90 and the raised annular portion 92. The thrust cap 90 is also secured by bolts 40 to housing 42. The threaded stud 88 integral with stem 64 extends through cavity 45 and into recessed portion 94 and has threaded thereon a locknut 100. Also received on stud 88 are a pair of annular thrust washers 102 and 104 having positioned therebetween a biasing means or resilient Belleville spring assembly 106. A Belleville spring is desirable not only because it is compact but because the force required to move it from a normal relaxed condition can be accurately gauged. The spring 106 maintains thrust washer 102 in abutting relation with the recessed shoulder portion 108 on the rear face of flange member 44. Thrust washer 102 is also maintained by spring 106 in abutting relation with shoulder portion 110 of stem portion 64. Thrust washer 104 is maintained in abutting relation with portion 92 by spring 106.

With the arrangement as just described, it follows that shaft 30 and bearing housing 62 are both movable relative to casing 43 or switch housing 42 in the direction of the axis of shaft 30. With bearing housing 62 being nonrotatably secured to the worm gear shaft 30 any axial movement of shaft 30 will compress the spring 106 and cause bearing housing 62 together with shaft 30 to slide or move axially within housing 42 in the direction of the axial movement of shaft 30. Spring 106 biases shaft 30 to resist axial movement under normal conditions and retains shaft 30 in the normal position.

Axial movement of the shaft 30 will occur in the event that the shaft of a valve operator or other mechanism keyed to the hollow hub 34 encounters an adverse operating condition or over torque. Should such an over torque or adverse condition occur the worm wheel 32 being driven by shaft 30 would be restrained against rotation and the worm gear shaft 30 would then move linearly relative to the worm wheel 32 and drive along the worm wheel 32 and compress Belleville spring 106. The direction of rotation of shaft 30 will determine the direction that it will move relative to the center of the worm wheel 32 and the predetermined preload of the spring 106 will determine the degree of restraining force the worm gear 31 must encounter before the shaft 30 will move axially within housing 42.

Figure 3:
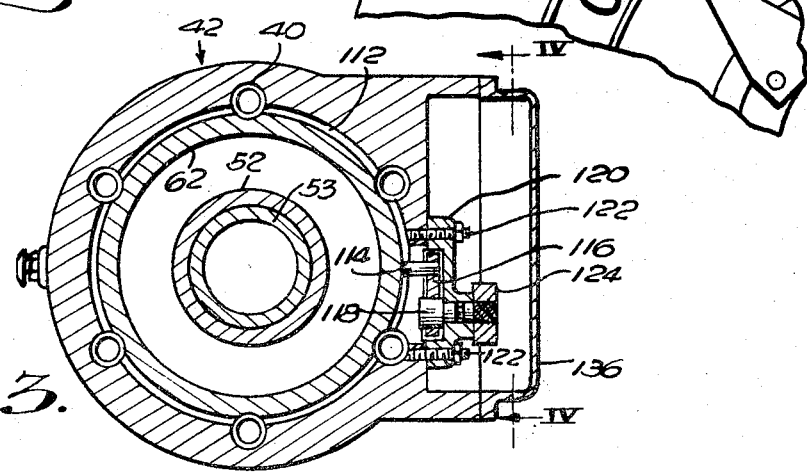
FIGURE 3 is a sectional view taken substantially along the line III—III of FIGURE 3.
Figure 4:
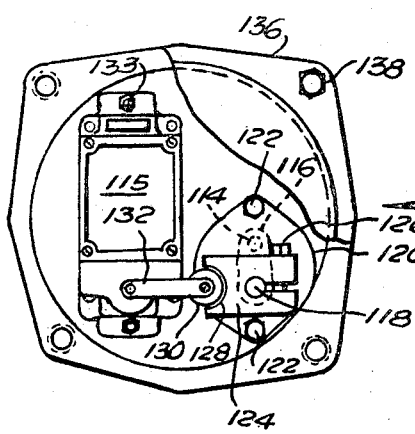
FIGURE 4 is a sectional view taken substantially along the line of IV—IV of FIGURE 3.

As best seen in FIGURE 3, an annular slot or groove 112 is provided in bearing housing 62 which receives the front end of pin 114 which is a part of a linkage means for connecting the bearing housing 62 to a limit switch 115 (see FIG. 4). The rear end of pin 114 is secured to lever arm 116 which is in turn secured to the front end of a short tripper shaft 118. The trigger shaft is rotatably mounted in tripper housing 120 which is bolted to housing 42 at 122. The rear end of tripper shaft 118 has secured thereto a tripper arm 124.

As best seen in FIGURE 4, tripper arm 124 is fastened to tripper shaft 118 by means of arm retainer bolt 126. The left side of the tripper arm, as viewed in FIGURE 4, includes an arcuate recessed portion 128 which receives the roller 130 which is rotatably secured to switch arm 132.

The switch 115 is electrically connected with the motor 12 and is bolted to housing 42 at 133 and is positioned adjacent to tripper housing 120. A switch cover 136 is bolted to housing 42 at 138.

In operation, in the event of an adverse operating condition as above described, bearing housing 62 acts as a switch operating means, and the worm gear 31 carried by the worm gear shaft 30 cooperates with the gear teeth on the worm wheel for causing the worm gear shaft to move linearly relative to the worm wheel between a normal operating position and a switch operating position in response to the worm wheel encountering a predetermined restraining force. Assuming for the moment axial movement of shaft 30 to the left, as viewed in FIGURES 1 and 2, bearing housing 62 too will move axially to the left thereby causing pin 114 to move to the left, and as viewed in FIGURE 3 in a direction out away from the drawing. This movement of pin 114 will be translated through rotation of lever arm 116 to tripper shaft 118 thereby causing shaft 118 to rotate in a counterclockwise manner as viewed in FIGURE 4. As tripper arm 124 is secured to shaft 118, it too will rotate in a counterclockwise manner to thereby engage roller 130 causing switch arm 132 to move downwardly in a clockwise direction, which in turn causes the switch 115 to open the circuit to the motor 12 and render the motor inoperative.

Axial movement of shaft 30 to the right, as viewed in FIGURES 1 and 2, will effect the reverse movements of those just described and also cause the switch 115 to open the circuit to the motor and render the motor inoperative. Therefore, axial movement of shaft 30 in either direction to its switch operating position effects axial movement of the bearing housing 62 which in turn effects deactuation of the electric motor 12 to thereby prevent any damage thereto, the reducing gear mechanism or the driven valve or other mechanism due to the adverse operating condition.

The threaded arrangement of bearing housing 62 and its associated parts including the neck end portion 50 of shaft 30 provides micrometer adjustment which is important since overall axial movement of the shaft 30 and bearing housing 62 is very limited and the shaft must normally remain in its operating position, namely, in driving engagement with worm wheel 32. When the switch 115 has been operated to render the motor inoperative, the driven mechanism, i.e., a valve, will then be jammed and the spring 106 cannot restore the shaft 30 to its normal operating position and reactivate switch 115 until the driven mechanism has been relieved.

FIGURE 5 illustrates the invention as applied to a mechanical movement where the driven shaft is moved rectilinearly instead of being rotated. As shown, the worm gear reducer unit 24 together with worm gear shaft 30 has been replaced by another unit shown generally at 140 which includes an enclosure 141. Unit 140 may, for instance, ultimately operate an intermediate gas duct section of the type disclosed in Patent 3,086,582, issued Apr. 23, 1963.

In the drawing, 142 represents an enclosure wall of a gas burner of the type disclosed in Patent 3,086,582, on the other side of which is an intermediate gas duct section (not shown) which is to be operated by the unit 140. Intermediate the unit 140 and reducing gear unit 10 is a switch housing 144 which is bolted at 145 to the unit 10; the enclosure 141 being bolted to housing 144 at 146 and to wall 142 at 148.

A shaft 150 is connected at one end thereof to the output shaft of the reducing gear unit 10 and extends through housing 144 into unit 140. The shaft 150 includes a threaded portion 152. A hollow shaft 154 is supported in bearings 156 in the wall 142 and surrounds the threaded portion 152 of shaft 150. Shaft 154 is internally threaded at one end thereof and threadably engages a nut member 158 which includes an internally threaded bore 160 into which the threaded portion 152 of shaft 150 screws. The nut member 158 is secured to shaft 154 by set screws 162. Rotation of shaft 150 will cause the nut member 158 together with shaft 154 to advance or retract relative thereto to thereby effect linear movement to the driven member or shaft 163' or to whatever is connected with the end thereof and as was mentioned above an intermediate gas duct section may be connected to the shaft 154.

Switch housing 144 includes an end wall 161 having an opening 163 through which shaft 150 passes. Within housing 144 is a thrust cap 164 which may be adjusted within housing 144 relative to end wall 161. The location of thrust cap 164 may be varied within housing 144 by means of adjusting screws 165. A locknut 167 is provided on the screws 165 to insure that the thrust cap 164, once located within the housing 144, will not move relative to end wall 161.

Axially movable within switch housing 144 and between end wall 161 and thrust cap 164 is an annular bearing housing 166 which houses bearing 168. The bearing neck portion 170 of shaft 150 is journaled by bearing 168. Adjacent to bearing neck portion 170 is an externally threaded portion 172 of the shaft 150 which threadably engages the bearing retainer 174. Bearing retainer 174 includes a face portion 176 which abuts the inner bearing race 178 and the annular shoulder portion 180 of bearing neck portion 170. Bearing race 178 is held in abutting relation with the annular shoulder portion 182 of the enlarged neck portion 184 of shaft 150. The bearing housing 166 includes an internally threaded annular bearing retainer 188. Bearing retainer 188 includes a shoulder portion 190 which abuts the outer bearing race 192. Bearing race 192 is held in abutting relation with annular shoulder portion 194 of bearing housing 166 by bearing retainer 188. With this arrangement, it can be seen that bearing housing 166 is nonrotatably secured to the shaft 150.

Positioned between the end wall 161 and the rear face 196 of bearing housing 166 is Belleville spring 198 and positioned between the front face 200 of bearing retainer 188 and the rear face 202 of thrust cap 164 is another Belleville spring 204.

By reason of the arrangement as just described, the bearing housing 166 is axially movable relative to housing 144 and is nonrotatably secured to the shaft 150. Axial movement of the shaft 150 to the left, as viewed in FIGURE 5, will cause bearing housing 166 to compress the spring 198 and cause bearing housing 166 to slide or move axially to the left within the housing 144. Also, movement of the shaft 150 to the right, as viewed in FIGURE 5, will compress the spring 204 and cause the bearing housing 166 to slide or move axially to the right within the housing 144.

Axial movement of the shaft 150 will occur in the event that the mechanism to be operated by the shaft 154 encounters an adverse operating condition such as becoming jammed. Should such an adverse operating condition occur the shaft 154 being driven by the shaft 150 would be restrained against movement and the threaded portion 152 of shaft 150 would advance or retract linearly through nut 158, depending upon the direction of rotation of shaft 150, and compress either spring 198 or spring 204. The direction of rotation of shaft 150 will determine the direction that it will linearly advance or retract through nut 158 and the predetermined preload of the springs 198 and 204 will determine the degree of restraining force shaft or driven member 163' must encounter before the shaft 150 will move axially with respect to housing 144.

As best seen in FIGURE 6, an annular slot or groove 206 is provided in bearing housing 166 which receives the front end of a pin 208 which is part of a linkage means for connecting the bearing housing 166 to a limit switch 209 (see FIG. 7). The rear end of pin 208 is secured to lever arm 210 which is in turn secured to the front end of a short tripper shaft 212. The tripper shaft 212 is rotatably mounted in tripper housing 214 which is bolted to the housing 144 at 216. The rear end of tripper shaft 212 has secured thereto a tripper arm 218.

As best seen in FIGURE 7, the tripper arm 218 is fastened to tripper shaft 212 by means of arm retainer bolt 220. The right side of the tripper arm, as viewed in FIGURE 7, includes an arcuate recessed portion 222 which receives the roller 224 which is rotatably secured to switch arm 226.

The switch 209 is electrically connected with the motor 12 and is bolted to housing 144 at 230 and is positioned adjacent the tripper housing 214. A limit switch cover 232 is bolted to housing 144 at 231.

In the embodiment of the invention as shown in FIGURES 5 and 6, the threaded arrangement of the bearing housing 166 and its associated parts including the portion 172 of shaft 150 provides micrometer adjustment as in the case of the embodiment of the invention as shown in FIGURES 1–4.

In operation, in the event that the mechanism being operated by the shaft 154 encounters an adverse operating condition, as above described, bearing housing 166 acts as a switch operating means and the screw-threads carried by the shaft 150 cooperate with nut member 158 carried by the shaft 154 for effecting axial movement of the shaft 150 between a normal operating position and a switch operating position in response to the shaft or driven member 163 encountering a predetermined restraining force. Assuming for the moment axial movement of shaft 150 to the left, as viewed in FIG. 5, the bearing housing too will move axially to the left thereby causing pin 208 to move to the left, and as viewed in FIGURE 6 in a direction in toward the drawing. This movement of pin 208 will be translated through lever arm 210 to shaft 212 thereby causing shaft 212 to rotate in a counterclockwise manner, as viewed in FIGURE 7. As tripper arm 218 is secured to shaft 212, it too will rotate in a counterclockwise manner to thereby engage roller 224 causing switch arm 226 to move upwardly in a clockwise direction, which in turn causes the limit switch 209 to open the circuit to the motor 12 and render the motor inoperative.

Axial movement of the shaft 150 to the right, as viewed in FIGURE 5 will effect the reverse movements of those just described and also cause the switch 209 to open the circuit to the motor and render the motor inoperative. Therefore, axial movement of the shaft 150 in either direction to its switch operating position effects axial movement of the bearing housing 166 which in turns effects deactuation of the electric motor 12 to thereby prevent any damage thereto and/or the reducing gear mechanism due to the adverse operating condition.

In each embodiment herein described there is a drive shaft coupled to a driving motor for rotation by the motor and movable axially from a normal operating position to a position where it will actuate the switch to stop the motor, and there is a restraining means that holds the shaft in normal position until the driven member encounters abnormal resistance. This restraining means is preferably a yieldable means such as a spring assembly biasing the shaft to the normal position, but use of other restraining means, such as a shear pin, is not excluded. In both embodiments the drive shaft has a thread-like or helical portion thereon which in one case is a worm gear and in the other is a nut engaging thread but in either case motion is transmitted through a thread-like formation on the driving shaft to the driven member. It is the resistance encountered to movement of the driven member that creates the axial thrust through the threads to impart axial motion to the shaft necessary to move it from the normal to the motor switch opening position. The two examples here given show different applications of a drive when the driving member and driven member embody cooperating elements on the driving and driven members in which such a thrust on the drive shaft is generated.

The invention requires little modification of existing mechanisms and is especially applicable where heavy parts are to be moved by a motor, providing all of the torque required to normal operation but sensitive to above normal conditions. Since each rotation of the drive shaft transmits only a small increment of movement to the driven shaft, overtravel of the motor after its circuit is opened is not sufficient to cause damage, especially since the parts may be so arranged that the switch will break the motor circuit before the drive shaft has moved through its entire length of axial travel, thereby providing a cushion against breakage of the mechanism due to such overtravel or coasting of the motor.

It is realized that other modifications and variations will present themselves to those skilled in the art without departing from the spirit of this invention or the scope thereof as set forth in the appended claims.

Having thus described the invention, what is claimed and desired to be secured by Letters Patent is:

I claim:

1. In combination with electrically controlled power means,
   a worm gear reducer comprising,
      a supporting frame,
      a worm gear shaft having a worm gear thereon journalled in the supporting frame for both rotational and axial motion with respect to the supporting frame, and
   a worm wheel having gear teeth thereon journalled in the supporting frame for rotational movement with respect to the supporting frame, the worm gear shaft being operatively connected with the power means to be rotated thereby, and being operatively engaged with the worm wheel for effecting rotation of the latter,
   a switch housing carried by the suporting frame,
   switch operating means comprising a bearing housing located within the switch housing and being axially movable relative thereto, the worm gear shaft having an end portion projecting into the switch housing and extending into the bearing housing,
   a bearing means interposed between the bearing housing and the end of the worm gear shaft extending therein for permitting the end of the worm gear shaft to rotate freely within the bearing housing,
   the bearing housing being nonrotatably secured to the worm gear shaft end portion extending into the bearing housing whereby any axial movement of the worm gear shaft will be operative to effect axial movement of the bearing housing with respect to the switch housing,
   biasing means comprising a single preloaded spring being positioned in the switch housing and arranged to hold the bearing housing and drive shaft in a normal operating position and against axial motion,
   switch means electrically connected with the power means and carried by the switch housing adjacent to the bearing housing,
   the worm gear shaft and worm wheel cooperating with one another for effecting axial motion of the worm gear shaft with respect to the supporting frame between its normal operating position and a switch operating position in response to the worm wheel encountering a predetermined restraining force such that axial motion of the worm gear shaft effects axial movement of the bearing housing to effect deactuation of the power means when the worm gear shaft is in its switch operating position.

2. The combination as set forth in claim 1 wherein the switch housing comprises
   a casing including a flange member extending inwardly from the side walls thereof dividing the casing into first and second cavities communicating with each other through and opening in the flange member, and
   a thrust cap secured to the casing and forming an end wall thereof, the thrust cap having a recessed portion and a raised portion on the inside face thereof with the raised portion projecting into the first cavity, the bearing housing being positioned within the second cavity and having an axially extending stem portion projecting through the opening in the flange member into the first cavity, the preloaded spring being positioned between the raised portion of the thrust cap and the flange member, and being operatively engaged with the axially extending stem portion of the bearing housing for holding the bearing housing and the worm gear shaft against axial motion whereby the worm gear shaft is maintained in its normal operating position.

3. The combination as set forth in claim 2 wherein the bearing housing comprises a hollow body portion having axially extending side walls, the axially extending side walls of the hollow body portion having a groove, a linkage means for operatively connecting the bearing housing with the switch means comprising a pin positioned within the groove of the hollow body portion, a lever arm secured to the pin to be rotated thereby, a tripper shaft operatively connected with the lever arm to be rotated thereby, and a tripper arm secured to the tripper shaft to be rotated thereby, the arrangement being such that axial movement of the bearing housing is operative to rotate the pin which in turn rotates the lever, the tripper shaft and the tripper arm, the tripper arm being operatively connected with the switch means whereby rotation of the tripper arm actuates the switch means to effect deactuation of the power means.

4. In combination with an electrically controlled power means,
   a mechanical movement device comprising a first shaft operatively connected with the power means and a second shaft,
   a switch mounted adjacent to the first shaft and electrically connected with the power means,
   a driven member operatively connected with the second shaft,
   cooperating means carried by the first and second shafts operative to effect axial movement of the second shaft relative to the first shaft in normal operation, and being operative to effect axial movement of the first shaft between a normal operating position and a switch operating position in response to the driven member encountering a predetermined restraining force, and
   switch operating means secured to the first shaft operative to effect deactuation of the power means when the first shaft is in its switch operating position,
   the switch operating means comprising a bearing housing having an opening therethrough, the first shaft extending through the opening, a bearing means positioned within the opening and being interposed between the bearing housing and the first shaft for permitting the first shaft to rotate freely within the bearing housing, the bearing housing being nonrotatably secured with the first shaft whereby any axial movement of the first shaft will be operative to effect axial movement of the bearing housing.

5. The combination as set forth in claim 4 in which biasing means are positioned on opposite sides of the bearing housing to oppose axial movement thereof.

6. The combination as set forth in claim 4 wherein the bearing housing includes a groove, a linkage means for operatively connecting the bearing housing with the switch means comprising a pin positioned within the groove of the bearing housing, a lever arm secured to the pin to be rotated thereby, a tripper shaft operatively connected with the lever arm to be rotated thereby, and a tripper arm secured to the tripper shaft to be rotated thereby, the arrangement being such that axial movement of the bearing housing is operative to rotate the pin which in turn rotates the lever, the tripper shaft, and the tripper arm, the tripper arm being operatively connected with the switch means whereby rotation of the tripper arm actuates the switch means to effect deactuation of the power means.

References Cited
UNITED STATES PATENTS

| | | | |
|---|---|---|---|
| 3,024,403 | 3/1962 | Safford | 192—150 |
| 3,110,206 | 11/1963 | Hake | 192—150 |
| 3,214,669 | 10/1965 | Hackethal et al. | 192—150 |
| 3,242,756 | 3/1966 | Fry | 74—425 |
| 3,258,985 | 7/1966 | Jordan | 74—844 |
| 3,277,736 | 10/1966 | Goodman | 74—424.8 |
| 3,339,426 | 9/1967 | Heinz-Borggrafe | 74—425 |

ARTHUR T. McKEON, *Primary Examiner.*

U.S. Cl. X.R.

74—337, 425